US00RE49841E

(19) United States
(12) Reissued Patent
Dicharry

(10) Patent Number: US RE49,841 E
(45) Date of Reissued Patent: Feb. 20, 2024

(54) EXERCISE APPARATUS FOR IMPROVING BALANCE AND STABILITY

(71) Applicant: Jay Dicharry, Bend, OR (US)

(72) Inventor: Jay Dicharry, Bend, OR (US)

(73) Assignee: MOBO LLC, Bend, OR (US)

(21) Appl. No.: 17/707,663

(22) Filed: Mar. 29, 2022

Related U.S. Patent Documents

Reissue of:
(64) Patent No.: 10,843,039
Issued: Nov. 24, 2020
Appl. No.: 16/161,132
Filed: Oct. 16, 2018

(51) Int. Cl.
*A63B 21/00* (2006.01)
*A63B 71/06* (2006.01)
*A63B 22/16* (2006.01)
*A63B 21/04* (2006.01)

(52) U.S. Cl.
CPC ..... *A63B 22/16* (2013.01); *A63B 21/00069* (2013.01); *A63B 21/0442* (2013.01); *A63B 21/4034* (2015.10); *A63B 71/06* (2013.01); *A63B 2071/0602* (2013.01); *A63B 2071/0694* (2013.01)

(58) Field of Classification Search
CPC ..... A63B 21/0421; A63B 21/0442; A63B 21/00069; A63B 21/00065; A63B 21/00557; A63B 21/4034; A63B 21/4033; A63B 71/03; A63B 22/16; A63B 26/003; A63B 2071/0602; A63B 2071/0694; A63B 2071/025; A63B 2225/09; A63B 2225/10
See application file for complete search history.

(56) References Cited

U.S. PATENT DOCUMENTS 2,022,883 A * 12/1935 Gee ..... A61F 5/05866 602/5
3,525,522 A * 8/1970 Piller ..... A63B 22/16 482/80
3,911,907 A * 10/1975 Smith, Jr. ..... A61H 1/02 482/1
4,869,499 A * 9/1989 Schiraldo ..... A63B 21/4011 482/79
5,643,154 A * 7/1997 Awbrey ..... A63B 26/003 482/146
5,647,830 A * 7/1997 Togao ..... A63B 22/18 482/79
6,063,010 A * 5/2000 Howd ..... A63B 21/0004 482/121
7,357,766 B2 * 4/2008 Langer ..... A63B 21/0004 482/146
8,734,308 B1 * 5/2014 Joslin ..... A63B 22/16 482/142
9,295,873 B1 * 3/2016 LaCaze ..... A63B 21/4035
11,344,767 B1 * 5/2022 Lagioia ..... A63B 21/4049
2004/0087421 A1 * 5/2004 Lin ..... A63B 22/18 482/146

(Continued)

*Primary Examiner* — Patricia L Engle
(74) *Attorney, Agent, or Firm* — Leber IP Law; Celia H. Leber

(57) ABSTRACT

The present embodiments disclose an exercise apparatus including at least one rocker board dimensioned to support a user. A plurality of convex rockers are releasably engageable with the at least one rocker board to provide instability during an exercise. A cutout is positioned through the rocker boards to strengthen the intrinsic and extrinsic muscles of the user.

13 Claims, 5 Drawing Sheets

(56) References Cited

U.S. PATENT DOCUMENTS

| | | | | |
|---|---|---|---|---|
| 2011/0251031 | A1* | 10/2011 | Mayr | A63B 22/0087 482/121 |
| 2013/0178346 | A1* | 7/2013 | Lin | A63B 26/003 482/146 |
| 2016/0263424 | A1* | 9/2016 | LaCaze | A63B 21/068 |
| 2016/0325135 | A1* | 11/2016 | Franche | A63B 71/0054 |
| 2019/0336814 | A1* | 11/2019 | Begin | A63B 23/00 |
| 2020/0016454 | A1* | 1/2020 | Osti | A63B 22/18 |
| 2020/0406091 | A1* | 12/2020 | Weck | A63B 71/00 |

* cited by examiner

EXERCISE APPARATUS FOR IMPROVING BALANCE AND STABILITY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*RELATED APPLICATIONS*

*This application is a reissue application of U.S. Pat. No. 10,843,039 B2, issued from U.S. patent application Ser. No. 16/161,132, filed on Oct. 16, 2018, the contents of which is hereby incorporated by reference.*

TECHNICAL FIELD

The embodiments relate to an exercise apparatus, and more particularly relate to an exercise apparatus for the strengthening and rehabilitation of the muscles, tendons, and joints, of the lower extremities in addition to improving gait.

BACKGROUND

Exercise boards employing various means for creating instability have been used to promote workout intensity and improve balance. Increasing muscle activity through the use of various exercise routines has been effective in promoting a healthy anatomy, and improving physical performance.

Current methods and devices suffer substantial drawbacks. Many balance boards include a single platform upon which the user stands, allowing the user to use the entirety of both feet and their body to properly balance. These devices do not focus on the various muscles of the feet and toes which are considered crucial in proper balance and gait mechanics. While performing the balancing exercise barefoot may require more muscle recruitment from the feet and toes, these devices do not isolate the hallux ("big toe") as the primary driver of propulsive force during gait.

In some circumstances, isolation of each foot can be beneficial in developing the muscles each foot. The current devices do not provide a method for isolating each foot to promote the balanced utilization of the muscles required for proper gait.

SUMMARY OF THE INVENTION

This summary is provided to introduce a variety of concepts in a simplified form that is further disclosed in the detailed description. This summary is not intended to identify key or essential inventive concepts of the claimed subject matter, nor is it intended for determining the scope of the claimed subject matter.

In one aspect, an exercise apparatus includes at least one rocker board dimensioned to support a human. A plurality of convex rockers is releasably engaged with the rocker board(s) to provide instability during an exercise. A cutout is positioned through the rocker boards to isolate the second, third, fourth, and fifth rays of the user requiring the force necessary for balance to be generated by the first ray and foot.

In another aspect, the exercise apparatus includes a first rocker board and a second rocker board each having a top side and a bottom side. Each rocker board is configured to support the foot and the first ray of a user, each rocker board includes a cutout dimensioned to isolate the second, third, fourth, and fifth rays of the user. A plurality of apertures is positioned at suitable angles from a central axis of each rocker board. The apertures receive a convex rocker extending from the bottom side to reduce the stability of each rocker board.

In one aspect, the first and second rocker boards each include a foot indicator oriented to correspond to a central axis. The top side of each rocker board is a substantially planar surface.

In one aspect, the first ray of the user is the primary impetus of force to each rocker board during exercise activity. The apparatus is sufficiently dimensioned to permit a human to perform whole body exercises on one or both of the first and second rocker boards. In some embodiments, a subset of the plurality of apertures is configured to releasably engage with an auxiliary exercise device.

BRIEF DESCRIPTION OF THE DRAWINGS

A more complete understanding of the present invention and the advantages and features thereof will be more readily understood by reference to the following detailed description when considered in conjunction with the accompanying drawings wherein.

DETAILED DESCRIPTION

Figure 1:
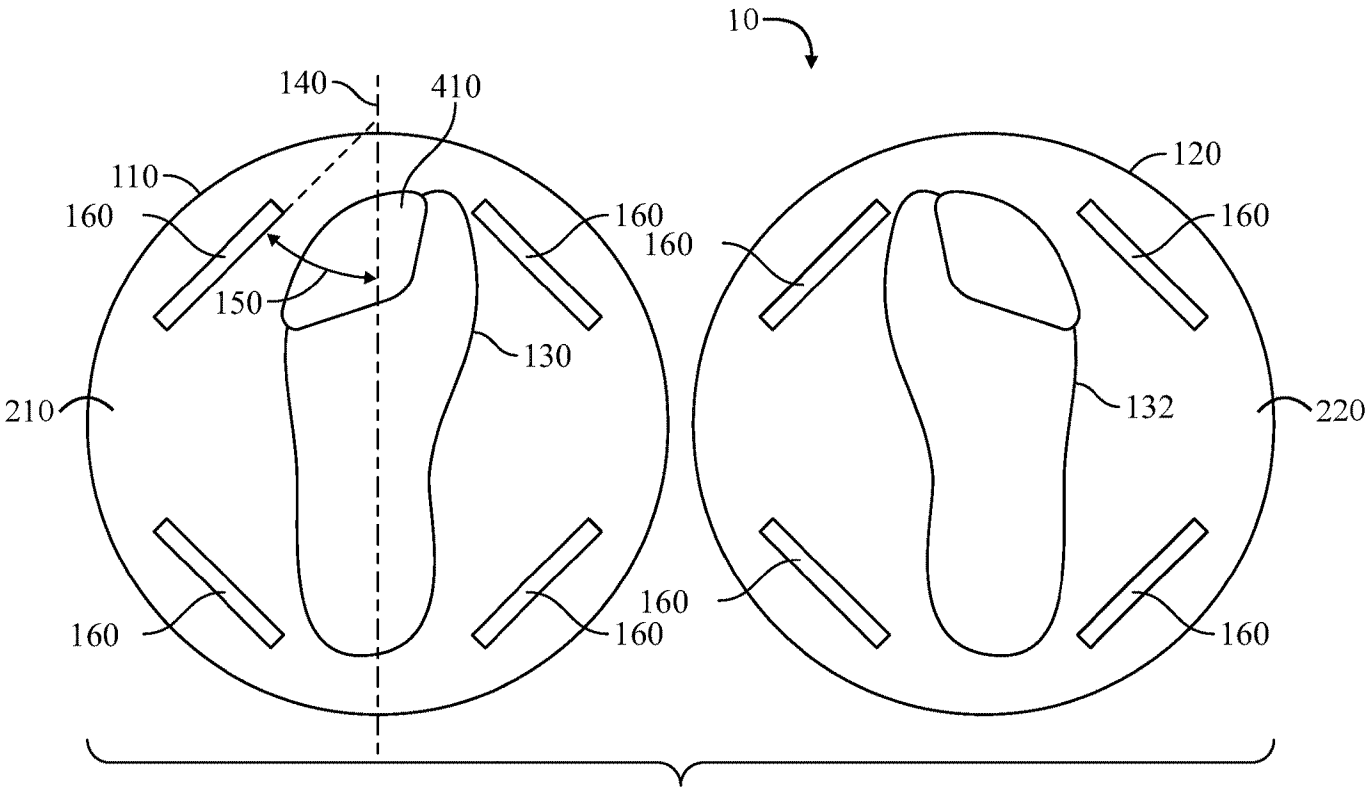
FIG. 1 illustrates a top plan view of the top surface of the rocker boards, according to some embodiments.

The specific details of the single embodiment or variety of 30 embodiments described herein are to the described system and methods of use. Any specific details of the embodiments are used for demonstration purposes only and not unnecessary limitations or inferences are to be understood therefrom.

Before describing in detail exemplary embodiments, it is noted that the embodiments reside primarily in combinations of components related to the system and method. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second", "left" and "right" and the like, may be used solely to distinguish one entity or element from another entity or element without necessarily requiring or implying any physical or logical relationship or order between such entities or elements.

Embodiments presented herein relate to an exercise apparatus to strengthen and rehabilitate muscle groups related to proper balance and gait of a human user. FIG. 1 shows the first rocker board 110 and second rocker board 120. It is understood by one skilled in the arts that each of the first and second rocker board 110,120 can be non-superimposable mirrored structures of one another to facilitate the human anatomy of the feet and toes. The top surfaces 210,220 are each dimensioned to support the right and left feet of the user such that the first rocker board 110 supports the left foot, and the second rocker board 120 supports the right foot. In some embodiments, a left indicator 130 and right indicator 132 are provided to identify proper foot placement to ensure a suitable central axis 140 is provided. The apertures 160 is positioned at a suitable angle 150 which is about 45° from the central axis 140. In some embodiments, the suitable angle 150 can include angles between 35° and 55° from the central axis 140 such that the angle 150 corresponds to the anatomical axis of pronation and supination of the foot.

The first and second rocker boards 110,120 are designed to support the weight of a person in many different positions, including standing and squatting positions in addition to any movement in common balancing muscle strengthening exercises. Each of the first and second rocker boards 110,120 are suitably dimensioned to support a foot and rays of the user such that no portion of the foot or rays is extending past the perimeter of the rocker boards 110,120. Suitable materials include wood, metals, and substantially rigid plastic materials.

Figure 2:
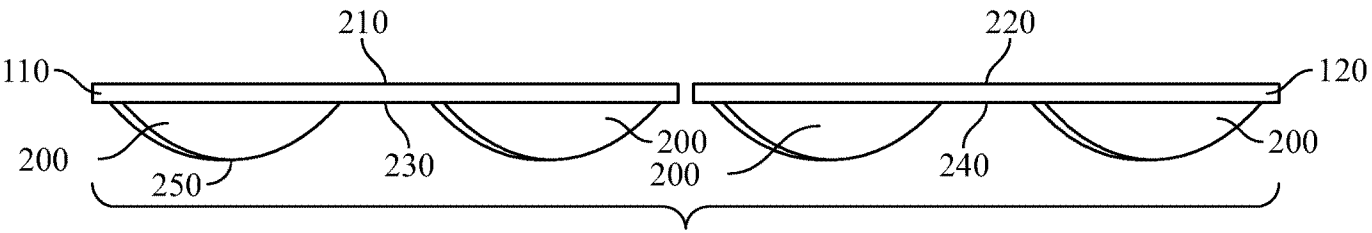
FIG. 2 illustrates a side elevation view of the rocker boards and convex members, according to some embodiments.

In some embodiments, each rocker board 110,120 is substantially planar to provide a suitable surface for standing, balancing, or exercising. FIG. 2 illustrates a plurality of convex rockers 200 engaged with one of the apertures 160 such that the convex rockers 200 protrude from the bottom surface 230,240 of the rocker boards 110,120. Auxiliary convex rockers (not shown) can be provided and releasably engaged with apertures 160 similarly as described above. During use, the user stands upon the top surface 210,220 of each rocker board 110,120. In some embodiments, two convex rockers 200 are positioned in parallel to protrude from the bottom surfaces of each rocker board 110,120. The two convex rockers 200 on a rocker board (such as 110) are herein referred to as a "set".

In some embodiments, a single convex rocker 200 is engaged with one or more apertures 160. The single convex rocker 200 can be constructed to support the user during an exercise routine.

Referring back to FIG. 1, one skilled in the arts will understand that the convex rockers 200 can be positioned at any combination of apertures 160 to provide additional exercise routines and altered muscle stimulation.

Convex rockers 200 may be provided as one of a set or kit to provide alternate angles of deflection and increased balancing difficulty. The convex surface 250 on the rocker plates defines the rate of change of the angle of deflection of the board. The board may be deflected as much as perpendicular, i.e., 45°, to the ground, but for most embodiments, the maximum angle of deflection of the board is between 10° and 35°. In a preferred embodiment, the maximum angle of deflection is between 12° and 16°. The user may increase the difficulty by using convex rockers having a more sharply curved convex surface. Each convex rocker 200 may be shaped as a semi-circle, semi-sphere, or semi-ovoid member. In an alternate embodiment, each convex rocker 200 is pivotally engaged with one or more apertures 160 to provide varying planes of deflection during exercise.

Figure 3:
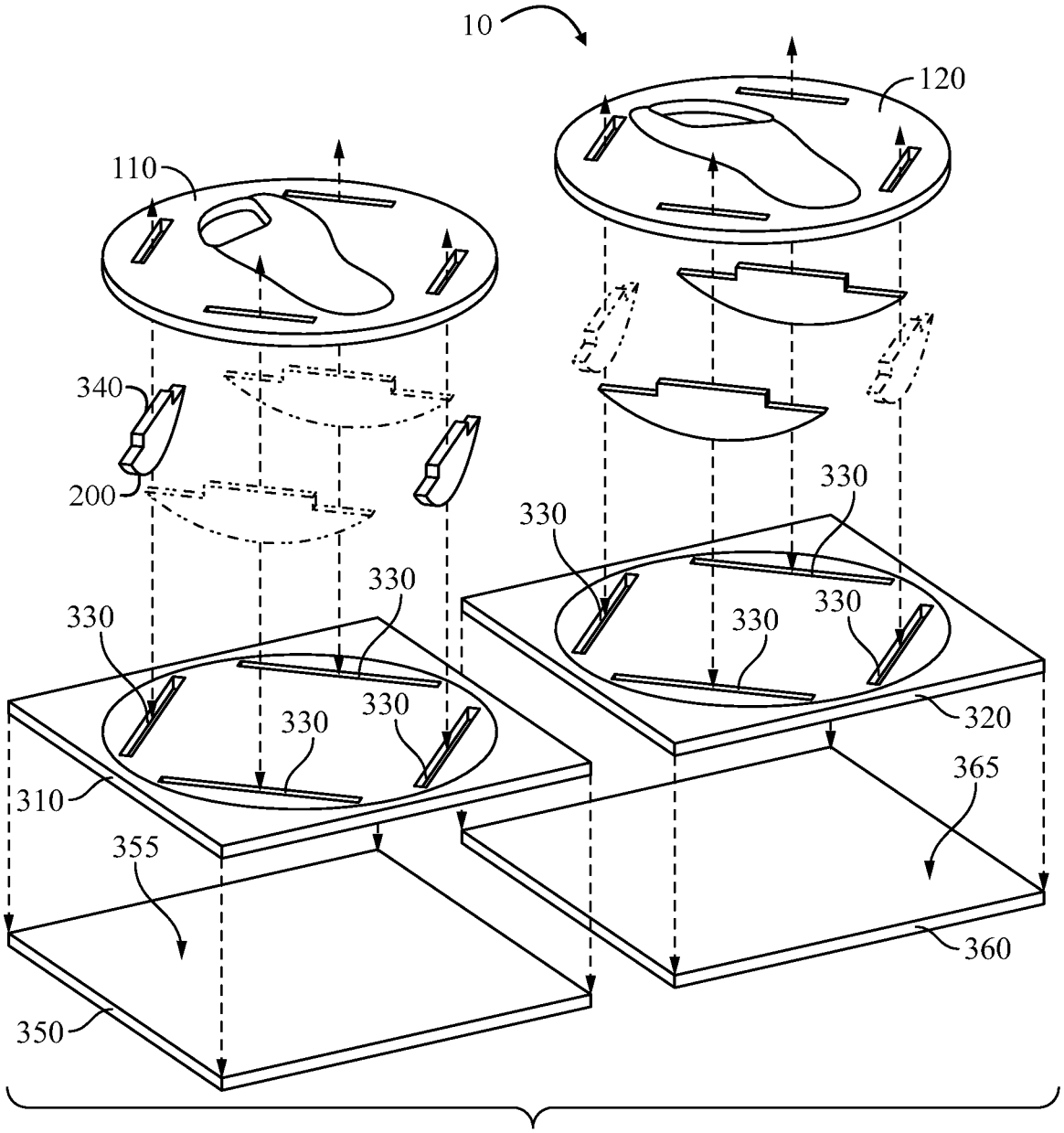
FIG. 3 illustrates an exploded view of the apparatus, according to some embodiments.

FIG. 3 shows the apparatus 10 having a base 355,365 configured to lie atop a substantially flat surface 350,360. Each platform 310,320 is positioned between the corresponding base 355,365 and the rocker board 110,120. Each platform includes sets of recessed channels 330 dimensioned to receive and retain the convex rockers 200 and rocker boards 110,120 connected thereto. The convex rockers 200 each include a mounting portion 340 which is insertable into an aperture 160 to retain the convex rockers 200 at the bottom surfaces 230,240 of each rocker board 110,120.

The apparatus 10 can be configured to exercise with a single foot (left or right) of the user, or as a set such that both the left and right feet of the user are exercised. The embodiment illustrated in FIG. 3 can be otherwise shown wherein bases 355,365 are configured as a single connected component. Further, platforms 310,320 may also be configured as a single connected component.

It will be understood by one skilled in the art that a variety of instability members (illustrated as convex rockers 200) can be utilized to promote the strengthening of the anatomy and a proper gait. Instability members can include the convex rockers 200 shown, in addition to one or more balance domes, one or more rollers, or other suitable instability members.

Figure 4:
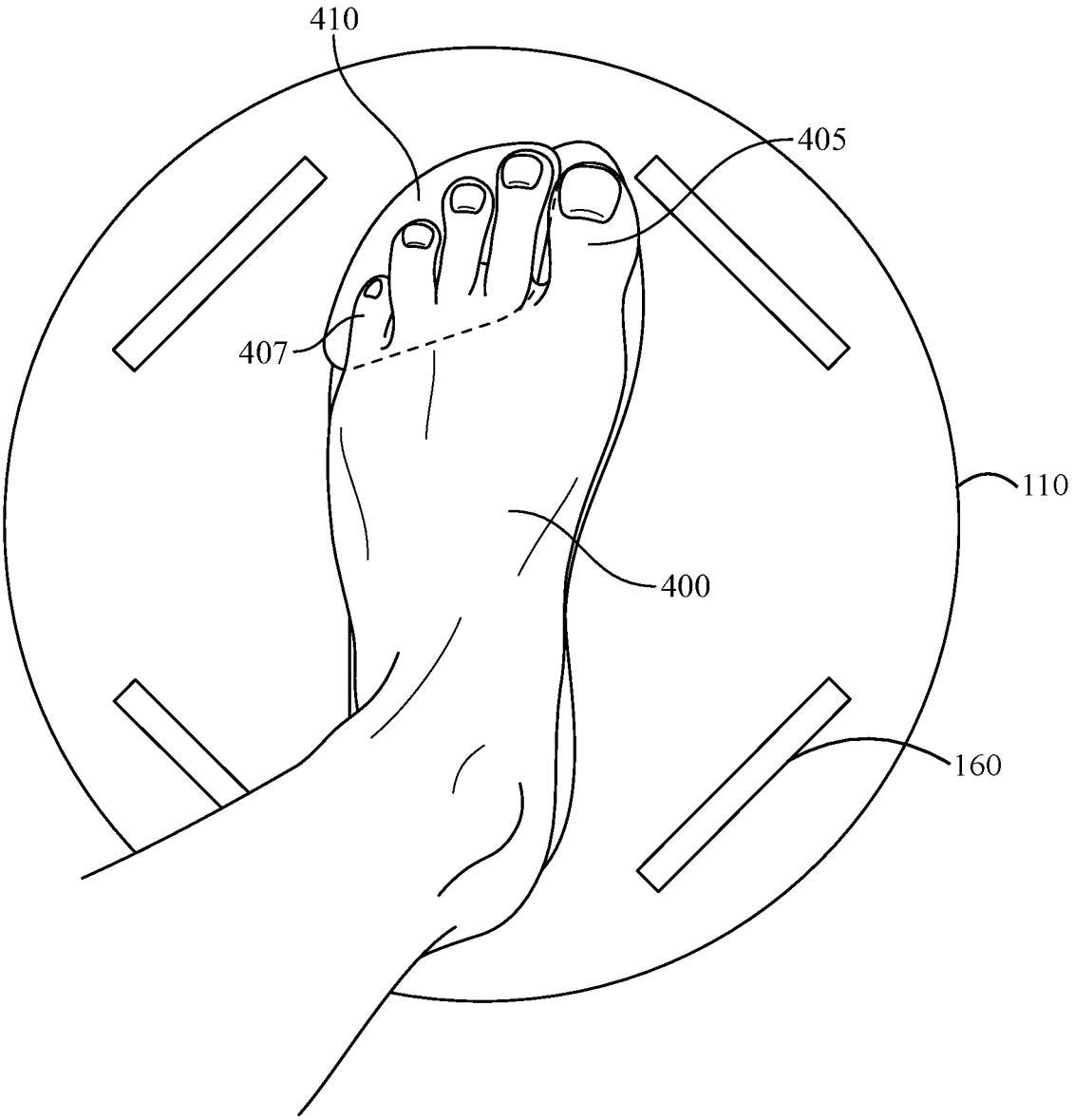
FIG. 4 illustrates a top plan view of a foot positioned on the rocker board, according to some embodiments.

FIG. 4 illustrates a foot (shown as the user's left foot) 400 having the first ray (i.e., big toe) 405 contacting the top surface 210 of the first rocker board 110. The second, third, fourth, and fifth rays (herein referred collectively as 407) are positioned at a cutout 410 to isolate the second, third, fourth, and fifth rays 407 from contacting the top surface 210 of the first rocker board 110. The cutout 410 is provided through the entire thickness of the first rocker board 110 such that the [first,] second, third, [and] fourth *and fifth* rays 407 are unable to sufficiently contact a surface to provide a balancing force. The first ray 405 resides on the top surface 210 to provide sufficient force to balance the user atop the rocker board 110 during use.

One skilled in the arts will understand that FIG. 4 as shown and described can be readily implemented with the user's right foot and corresponding second rocker board 120. Further, each rocker board 110,120 can be turned upside down to exercise either foot. For example, the first rocker board 110 can first be used to exercise the left foot by positioning the of convex rockers 200 on the bottom surface 230 and placing the foot on the top surface 210. The right foot can be exercised by removing the convex rockers 200 from the bottom surface 230 and engaging the convex rockers 200 with the top surface 210, while the right foot contacts the bottom surface 230 of the first rocker board 110.

Figure 5:
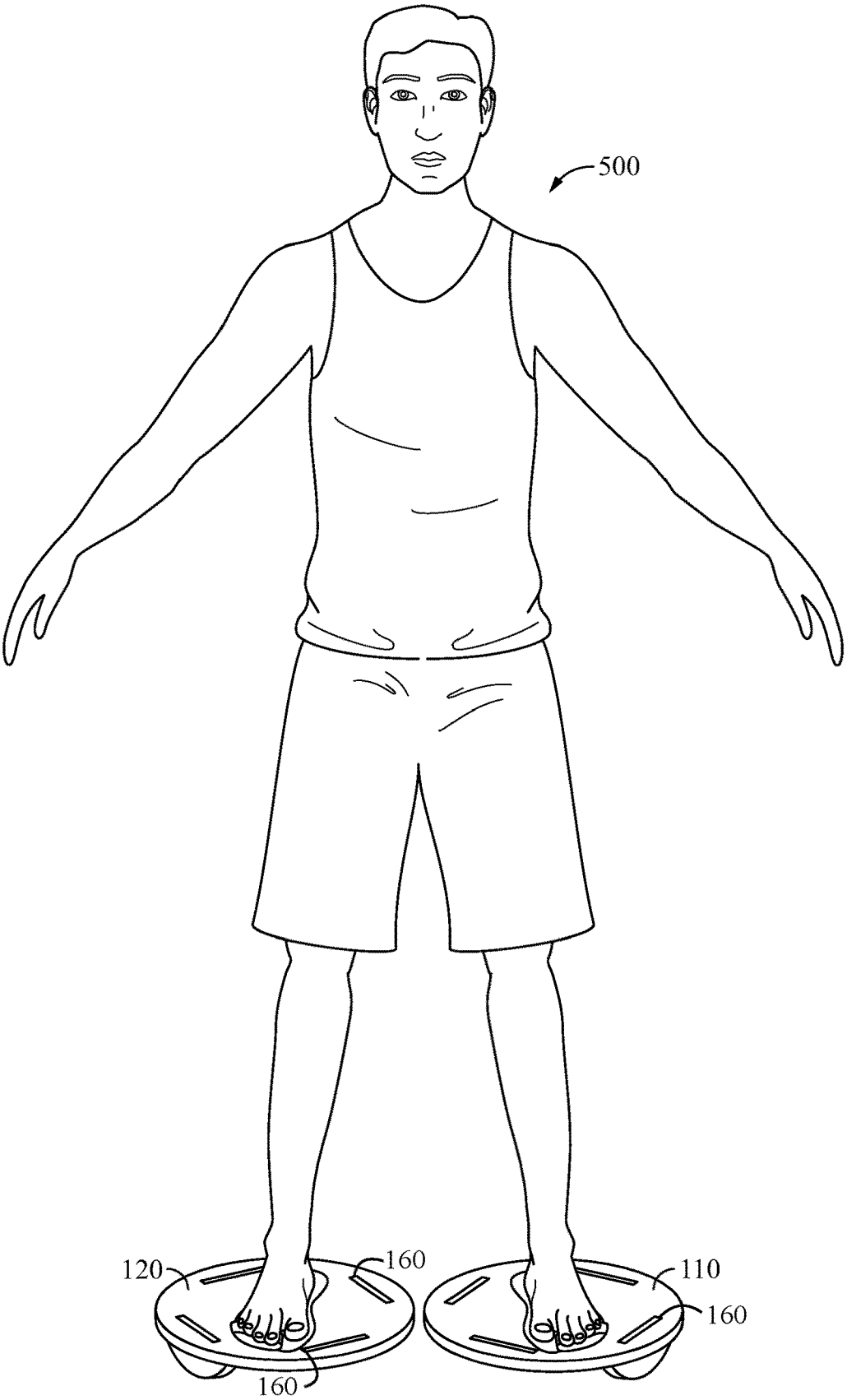
FIG. 5 illustrates a user exercising on the apparatus, according to some embodiments.

Now referring to FIG. 5, a user 500 is shown balancing atop each rocker board 110,120. In some embodiments, two convex rockers 200 (i.e., a set) are positioned in parallel to releasably engage with the first rocker board 110, while two convex rockers 200 (i.e., a second set) are positioned on the second rocker board 120 such that the convex rockers 200 on the first rocker board 110 are perpendicular to the convex rockers 200 on the second rocker board 120. The user 500 can then stand and balance on the rocker boards 110,120 while positioning the first ray 405 having sufficient contact with the top surfaces 210,220 and isolating the second, third, fourth, and fifth rays 407 over or partially through the respective cutout 410.

Figure 6:
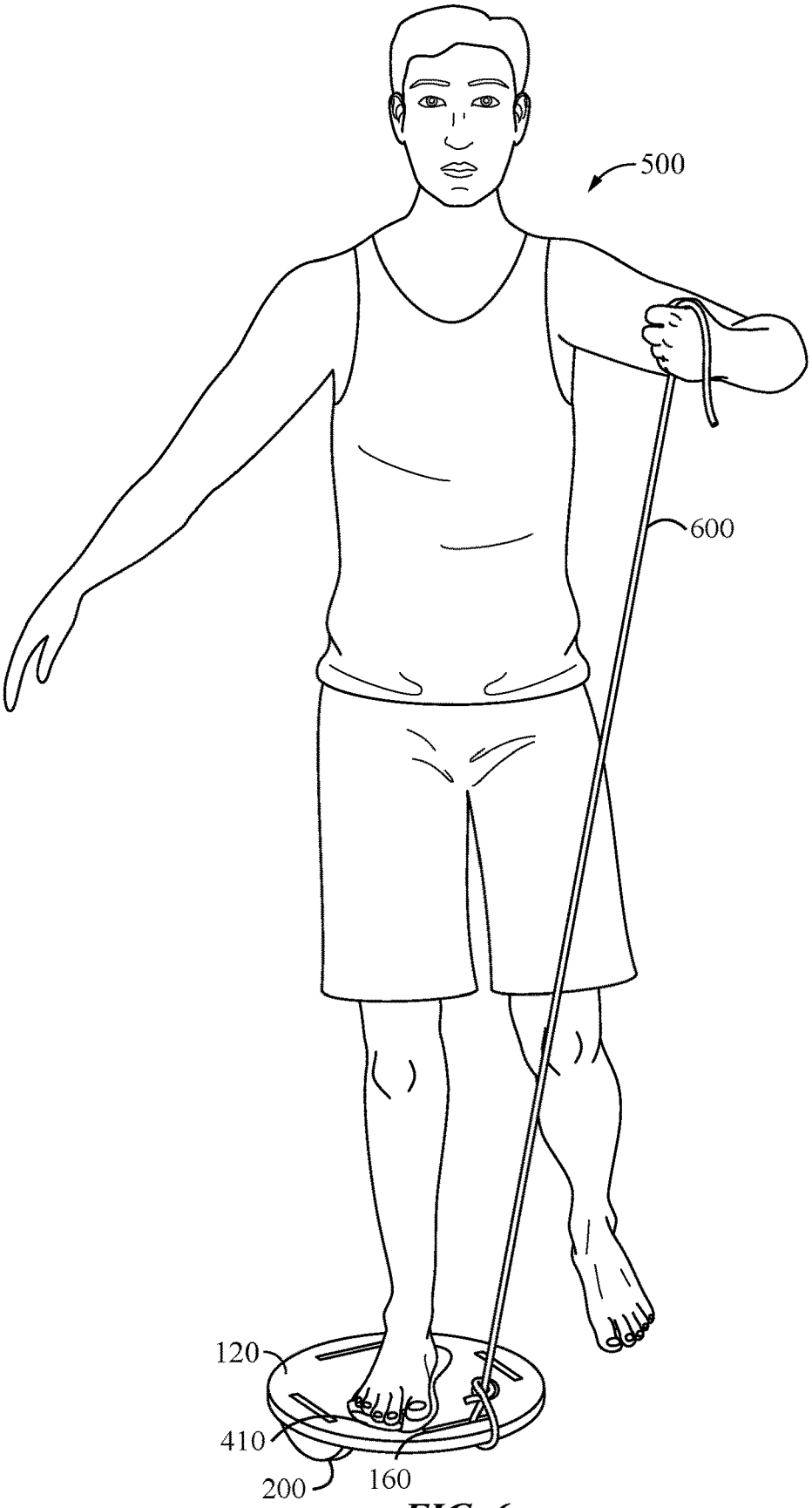
FIG. 6 illustrates a user exercising on the apparatus with an auxiliary exercise device, according to some embodiments.

FIG. 6 shows the user 500 standing upon the first rocker board 110. An auxiliary exercise device 600 is shown mounted to an aperture 160 of the rocker board 120. In the illustrated embodiment, the auxiliary exercise device 600 is a resistance band fastened to the aperture 160 by looping and tying the exercise band through the aperture 160. The exercise band is pulled by the hand of the user to impart an unstable force to the rocker board 120. The first ray and foot forcefully balance the user 500 while the second, third, fourth, and fifth rays of the user 500 are isolated by the cutout 410.

Intrinsic and extrinsic muscles are strengthened as the user 500 engaged in various exercises while using the apparatus 10. The user 500 utilizes the intrinsic and extrinsic muscles in communication with the leg, foot, and first rays to manipulate and stabilize each rocker board 110,120 during an exercise.

The apparatus 10 allows for users having differing levels of capabilities by providing interchangeable and modular components as part of a set. In one example, the degree of difficulty in balancing on one or more of the rocker boards 110,120 throughout an exercise by providing a numbering of different convex rockers 200 having varying shape, size, and radius of curvature. In one example, the diameter of each convex rocker 200 and height of each convex rocker 200 may vary between sets of predetermined ranges.

One skilled in the arts will recognize various exercise positions, protocols, and techniques that will be useful with the apparatus 10. The exercise may not be limited to standing positions, as sitting techniques can be useful, especially in compromised or otherwise rehabilitating users.

To provide suitable top surfaces 210,220 a cover may be provided having favorable grip, feel, softness, tack, or texture to ensure comfort and adequate friction between the foot of the user and the rocker boards 110,120.

From the foregoing, it will be appreciated that the present invention provides a versatile exercise apparatus having a platform for exercising to which different forms and shapes of instability members and exercise attachments may be detachably mounted so that the person using the apparatus may perform a wide variety of exercises in a number of different exercise positions on the platform.

The exercises may be performed on the platform either with or without weights, exercise attachments on the top surface of the platform or other external exercise devices including but not limited to exercise bands, medicine balls, and weights.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

[1. An exercise apparatus, comprising:

at least one rocker board, having dimensions configured to support a user;

one or more convex rockers releasably engageable in one or more of a plurality of apertures in the at least one rocker board;

a cutout positioned through the entire thickness of the at least one rocker board, the cutout configured to isolate one or more rays, excluding a first ray, of the user; and a base and a platform positioned between the base and the at least one rocker board, the platform having a plurality of recessed channels dimensioned to retain a convex surface of each convex rocker.]

[2. The apparatus of claim 1, wherein the at least one rocker board include a planar top surface and a planar bottom surface.]

[3. The apparatus of claim 1, wherein the one or more convex rockers comprises two or more convex rockers, wherein two convex rockers are a single set of convex rockers, and wherein each convex rocker of the single set is positioned in parallel.]

[4. The apparatus of claim 1, wherein the one or more of the plurality of apertures are further configured to releasably engage with an auxiliary exercise device.]

[5. An exercise apparatus comprising:

a first and a second rocker board, the first rocker board configured to support the left foot of a user, the second rocker board configured to support the right foot of the user, each rocker board having a top surface and a bottom surface, each top surface including a foot indicator defining proper foot placement of the user;

a plurality of apertures in each of the first and second rocker boards, each aperture of the plurality of apertures positioned at a pre-determined angle from a central axis of each of the first and second rocker boards, the plurality of apertures each dimensioned to be capable of releasably receiving a convex rocker, the convex rocker extendable from the bottom surface to reduce the stability of the first and second rocker board; and a cutout through the first and second rocker boards, the cutout configured to receive a second, third, fourth, and fifth rays of the user such that the second, third, fourth, and fifth rays are unable to contact a top or bottom surface of the rocker board to provide a balancing force.]

[6. The apparatus of claim 5, wherein each foot indicator is oriented to correspond to a central axis in each of the first and second rocker boards.]

[7. The apparatus of claim 5, wherein the pre-determined angle of each aperture of the plurality of apertures is between 35° and 55° from a central axis in each of the first and second rocker boards, corresponding to an anatomical axis of pronation and supination of a user's foot.]

[8. The apparatus of claim 5, wherein the primary impetus of a force to each rocker board is provided by the first ray of the user.]

[9. The apparatus of claim 5, further comprising a left base and a left platform positioned between the left base and left rocker board, a right base and a right platform positioned between the right base and right rocker board, each left and right platform having a plurality of recessed channels dimensioned to retain a convex surface of each convex rocker.]

[10. The apparatus of claim 9, wherein each rocker board, each convex rocker, each base, and each platform are configured as releasably engageable singular components.]

[11. The apparatus of claim 9, wherein each rocker board is dimensioned to accommodate a human performing whole body exercises on one or both of the first and second rocker boards.]

[12. The apparatus of claim 5, wherein the plurality of apertures in each of the first and second rocker boards are configured to releasably engage with an auxiliary exercise device.]

[13. An exercise apparatus comprising:

at least one platform positioned on at least one base, the platform including a plurality of recessed channels;

a first and a second rocker board, the first rocker board configured to support the left foot of a user, the second rocker board configured to support the right foot of the user, each rocker board having a top surface and a bottom surface, the top surface of each rocker board including an indicator defining proper foot placement of either the left or right foot;

wherein said indicator is positioned along a central axis of each rocker board;

a plurality of apertures in each of the first and the second rocker boards, each aperture of the plurality of apertures positioned at a pre-determined angle from the central axis of each rocker board, each aperture of the plurality of apertures dimensioned to receive a convex rocker, each convex rocker extending from the bottom surface to reduce the stability of each rocker board;

wherein each convex rocker extending from the bottom surface of each of each rocker board is configured to align with a recessed channel of the plurality of recessed channels in the platform; and a cutout through the first and second rocker boards, the cutout configured to receive and isolate a second, third, fourth, and fifth rays of the user to strengthen the intrinsic and extrinsic muscles and a first ray of the user related to balance and gait.]

[14. The apparatus of claim 13, wherein at least two convex rockers are positioned in parallel along the bottom surface of each of the first and second rocker boards.]

[15. The apparatus of claim 13, wherein two sets of two each convex rockers are positioned substantially perpendicular along the bottom surface of each rocker board.]

[16. The apparatus of claim 13 wherein the top surfaces of the first and second rocker boards are covered with a resilient material to create friction or texture between the rocker board and the foot of the user.]

[17. The apparatus of claim 13, wherein each rocker board, each convex rocker, the at least one base, and the at least one platform are configured as releasably engageable singular components.]

[18. The apparatus of claim 13, further comprising at least one auxiliary exercise device mounted to at least one of the first and second rocker boards.]

[19. The apparatus of claim 18, wherein one or more of the plurality of apertures are configured to releasably engage with the auxiliary exercise device to selectively increase a resistance along a portion of the at least one of the first and second rocker boards.]

*20. An exercise apparatus, comprising:*

*a rocker board having dimensions configured to support the weight of a user, said rocker board configured for the placement and support of one foot of the user and a first ray of said foot;*

*a cutout through said rocker board, said cutout configured such that a second, third, fourth and fifth ray of said foot of the user are unable to sufficiently contact a surface to provide a balancing force when positioned above said cutout, and said cutout oriented on said rocker board such that the first ray of said foot is supported when the second, third, fourth and fifth rays of said foot are positioned above the cutout; and*

*two or more convex rockers engageable in two or more of a plurality of apertures in the at least one rocker board.*

*21. The exercise apparatus of claim 20 wherein the cutout through the rocker board is further oriented so that a user's foot lies along a central axis through the rocker board when the second, third, fourth and fifth rays of said foot are positioned above the cutout; and wherein the apertures are at suitable angles from said central axis such that the angles correspond to the anatomical axis of pronation and supination of the foot.*

*22. The exercise apparatus of claim 21 wherein the suitable angle is from 35 degrees to 55 degrees from the central axis.*

*23. The exercise apparatus of claim 21 wherein the suitable angle is about 45 degrees from the central axis.*

*24. The exercise apparatus of claim 20 wherein the convex surface of the rocker produces an angle of deflection of the rocker board of 45 degrees or less.*

*25. The exercise apparatus of claim 24 wherein the angle of deflection is between 10 degrees and 35 degrees.*

*26. The exercise apparatus of claim 24 wherein the angle of deflection is between 12 degrees and 16 degrees.*

*27. The exercise apparatus of claim 21 wherein the rocker board includes a foot indicator along the central axis.*

*28. The exercise apparatus of claim 21 wherein the rocker board is further configured for the placement and support of one foot of the user on either of the top surface or a bottom surface of the rocker board;*

*the cutout through the rocker board is further oriented so that a user's right foot lies along the central axis through the rocker board when the second, third, fourth and fifth rays of said user's right foot are positioned above the cutout, and so that, when the rocker board is turned over, said user's left foot lies along the central axis through the rocker board when the second, third, fourth and fifth rays of said user's left foot are positioned above the cutout; and*

*the apertures are each further configured to releasably engage a convex rocker on either of said top and bottom surfaces of said rocker board.*

*29. The exercise apparatus of claim 28 wherein one of the top and bottom surfaces of the rocker board includes a foot indicator for the user's right foot and the opposite surface of the rocker board includes a foot indicator for the user's left foot.*

*30. The exercise apparatus of claim 20 wherein the one or more of the plurality of apertures are further configured to releasably engage with an auxiliary exercise device.*

*31. The exercise apparatus of claim 20 further comprising a platform having a plurality of recessed channels, each channel dimensioned to releasably hold the bottom convex surface of one of each convex rockers, and further comprising a base on which said platform sits, said base configured to lie atop a substantially flat surface.*

*32. An exercise apparatus, comprising:*

*a first and a second rocker board having dimensions configured to support the weight of a user, said first and*

*second rocker board each configured for the placement and support of one foot of the user and a first ray of said foot;*

*a plurality of apertures in each of the first and second rocker boards, each aperture of the plurality of apertures positioned at a pre-determined angle from a central axis of each of the first and second rocker boards, the plurality of apertures each dimensioned to be capable of receiving a convex rocker, the convex rockers, when received in the apertures, extending from the rocker board to reduce the stability of the first and second rocker board;*

*a cutout through said first rocker board, said cutout configured such that a second, third, fourth and fifth ray of a right foot of the user are unable to sufficiently contact a surface to provide a balancing force when positioned above said cutout, and said cutout oriented on said first rocker board such that the first ray of said right foot is supported when the second, third, fourth and fifth rays of said right foot are positioned above the cutout;*

*a cutout through said second rocker board, said cutout configured such that a second, third, fourth and fifth ray of a left foot of the user are unable to sufficiently contact a surface to provide a balancing force when positioned above said cutout, and said cutout oriented on said second rocker board such that the first ray of said left foot is supported when the second, third, fourth and fifth rays of said left foot are positioned above the cutout.*

* * * * *